(12) United States Patent
Park et al.

(10) Patent No.: US 11,562,133 B2
(45) Date of Patent: Jan. 24, 2023

(54) SYSTEM AND METHOD FOR DETECTING INCORRECT TRIPLE

(71) Applicant: FOUNDATION OF SOONGSIL UNIVERSITY-INDUSTRY COOPERATION, Seoul (KR)

(72) Inventors: Young Tack Park, Seoul (KR); Wan Gon Lee, Seoul (KR); Jagvaral Batselem, Seoul (KR); Hyun Young Choi, Seoul (KR); Ji Houn Hong, Gyeonggi-do (KR)

(73) Assignee: FOUNDATION OF SOONGSIL UNIV-INDUSTRY COOPERATION, Seoul (KR)

( * ) Notice: Subject to any disclaimer, the term of this patent is extended or adjusted under 35 U.S.C. 154(b) by 437 days.

(21) Appl. No.: 16/696,476

(22) Filed: Nov. 26, 2019

(65) Prior Publication Data
US 2020/0175226 A1    Jun. 4, 2020

(30) Foreign Application Priority Data

Dec. 4, 2018   (KR) .................. 10-2018-0154139
Apr. 11, 2019  (KR) .................. 10-2019-0042525

(51) Int. Cl.
*G06F 40/20*    (2020.01)
*G06F 40/166*   (2020.01)
(Continued)

(52) U.S. Cl.
CPC ............ *G06F 40/20* (2020.01); *G06F 40/166* (2020.01); *G06K 9/623* (2013.01); *G06K 9/6223* (2013.01); *G06N 20/20* (2019.01)

(58) Field of Classification Search
CPC ....... G06F 40/20; G06F 40/166; G06N 20/20; G06N 20/10; G06K 9/6223; G06K 9/623
See application file for complete search history.

(56) References Cited

U.S. PATENT DOCUMENTS

2009/0006463 A1 *   1/2009   Mehra ..................... G06F 16/25
2018/0039695 A1 *   2/2018   Chalabi .................. G06N 5/022
(Continued)

FOREIGN PATENT DOCUMENTS

KR    1020170101609 A    2/2016
KR    1020180092194 A    8/2018
KR    1020190033269 A    3/2019

OTHER PUBLICATIONS

Yu et al. "Extending Functional Dependency to Detect Abnormal Data in RDF Graphs", ISWC, pp. 794-809, 2011 (Year: 2011).*

(Continued)

*Primary Examiner* — Pierre Louis Desir
*Assistant Examiner* — Nicole A K Schmieder
(74) *Attorney, Agent, or Firm* — Blueshift IP, LLC; Robert Plotkin

(57) ABSTRACT

Provided is an incorrect triple detection system including a triple selector configured to select a target triple (subject, type, object) in a knowledge base, a sampler configured to create a sentence model by connecting object triples sharing entities included in the target triple, a model builder configured to embed the sentence model into a vector space to create a training entity vector and build an embedding model, and an incorrect triple detector configured to detect an incorrect triple by inputting a test triple into the embedding model.

12 Claims, 8 Drawing Sheets

(51) Int. Cl.
G06K 9/62 (2022.01)
G06N 20/20 (2019.01)

(56) References Cited

U.S. PATENT DOCUMENTS

2018/0075368 A1* 3/2018 Brennan ................ G06N 20/00
2019/0087724 A1* 3/2019 Park ......................... G06N 3/08
2020/0097597 A1* 3/2020 Lourentzou ........... G06F 40/211

OTHER PUBLICATIONS

Ji-Hun Hong, "Incorrect Triple Detection in Knowledge Base Using Embedding Model," Master's Thesis, Computer Science, Soongsil University, 53 pages (Aug. 31, 2018).

* cited by examiner

SYSTEM AND METHOD FOR DETECTING INCORRECT TRIPLE

CROSS-REFERENCE TO RELATED APPLICATION

This application claims priority to and the benefit of Korean Patent Applications No. 10-2018-0154139, filed on Dec. 4, 2018 and No. 10-2019-0042525, filed on Apr. 11, 2019 the disclosure of which is incorporated herein by reference in its entirety.

BACKGROUND

1. Field of the Invention

The present disclosure relates to an incorrect triple detection system and method, and more particularly, to a system and method for detecting an incorrect triple in a knowledge base based on an embedding model.

2. Discussion of Related Art

In the case of existing research and the related art, studies have been conducted to define rules using structural features, such as contradictory rules and duplicate rules, and detect inconsistencies on the basis of the rules. According to the related art, a case in which the preambles of rules are the same and there is a negative relation between the conclusions thereof and a case in which the preambles of two rules are the same and the conclusions thereof are different are defined according to rules to detect inconsistent knowledge base errors.

According to the related art, rules are defined to detect inconsistencies in a knowledge base, and knowledge that may lead to erroneous results may be found on the basis of the rules. However, according to the related art, problems related to inconsistencies can be fixed, but all rules for detecting other knowledge base errors cannot be directly defined and verified.

SUMMARY OF THE INVENTION

The present disclosure is directed to providing an incorrect triple detection system and method for detecting errors in a knowledge base to improve the quality and performance of existing knowledge services.

The present disclosure is also directed to providing an incorrect triple detection system and method for increasing the accuracy of a task of inferring new knowledge from a knowledge base.

The present disclosure is also directed to providing an incorrect triple detection system and method which are applicable to various service fields of artificial intelligence using a knowledge base.

According to an aspect of the present disclosure, an incorrect triple detection system includes a triple selector configured to select a target triple (subject, type, object) in a knowledge base, a sampler configured to create a sentence model by connecting object triples sharing entities included in the target triple, a model builder configured to embed the sentence model into a vector space to create a training entity vector and build at least one of an embedding model or a relation model, and an incorrect triple detector configured to detect an incorrect triple by inputting a test triple into the embedding model.

The sampler may create the sentence model by removing entities of the object triples.

The sampler may set the number of relations differently for each of the entities of the target triple.

The incorrect triple detection system may further include a filtering unit configured to filter out unrelated entities from the embedding model.

The model builder may build the embedding model by performing clustering using the training entity vector.

The model builder may build the embedding model by applying a K-means clustering method.

The model builder may normalize the embedding model by applying a threshold to a range of K clusters.

The incorrect triple detector may detect the test triple not included in the range of K clusters as an incorrect triple.

The model builder may embed the sentence model into the vector space through at least one of Skip-gram or Glove.

The model builder may build the relation model by learning the training entity vector through at least one of TransE, TransR, NTN, or HolE.

According to another aspect of the present disclosure, an incorrect triple detection method includes selecting a triple by selecting a target triple (subject, type, object) in a knowledge base, creating a sentence model by connecting object triples sharing entities included in the target triple, building a model by embedding the sentence model into a vector space to create a training entity vector and building at least one of an embedding model or a relation model, and detecting an incorrect triple by inputting a test triple into at least one of the embedding model or the relation model.

The creating of the sentence model may include creating the sentence model by removing entities of the object triples.

The creating of the sentence model may include setting the number of relations differently for each of the entities of the target triple.

The incorrect triple detection method may further include filtering out unrelated entities from the embedding model after the building of the model.

The building of the model may include building the embedding model by performing clustering using the training entity vector.

The building of the model may include building the embedding model by applying a K-means clustering method.

The building of the model may include normalizing the embedding model by applying a threshold to a range of K clusters.

The detecting of the incorrect triple may include detecting the test triple not included in the range of K clusters as an incorrect triple.

The building of the model may include embedding the sentence model into the vector space by at least one of Skip-gram or Glove.

The building of the model may include building the relation model by learning the training entity vector through at least one of TransE, TransR, NTN, or HolE.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
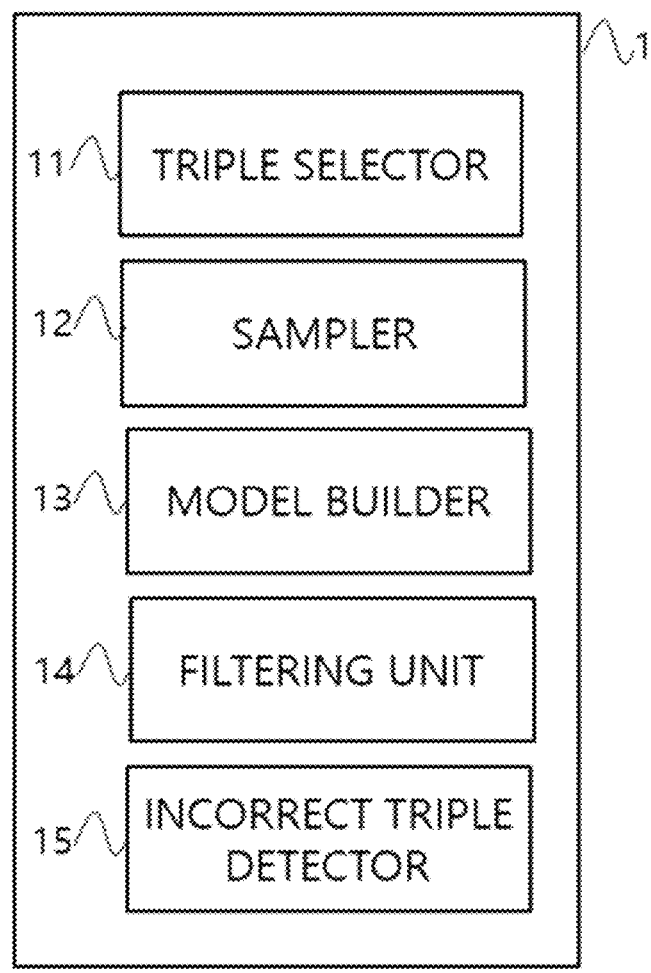
FIG. 1 is a block diagram of an incorrect triple detection system according to an embodiment of the present disclosure.

Hereinafter, embodiments of the present disclosure will be described in detail with reference to the accompanying drawings.

However, the technical idea of the present disclosure is not limited to some embodiments set forth herein but may be embodied in many different forms, and one or more of components of these embodiments may be selectively combined or substituted within the scope of the present disclosure.

All terms (including technical and scientific terms) used in embodiments of the present disclosure have the same meaning as commonly understood by those of ordinary skill in the art to which the present disclosure pertains, unless otherwise defined. Terms, such as those defined in commonly-used dictionaries, should be interpreted as having a meaning in the context of the relevant art.

In addition, the terms used in embodiments of the present disclosure are for the purpose of describing embodiments only and are not intended to be limiting of the present disclosure.

As used herein, singular forms are intended to include plural forms as well, unless the context clearly indicates otherwise. Expressions such as "at least one of A, B, or C (or one or more of A, B, and C)" should be understood to include one or more of all possible combinations of A, B, and C.

In addition, terms such as first, second, A, B, (a), and (b) may be used to describe components of embodiments of the present disclosure.

These terms are only for distinguishing the components from other components and thus the nature, sequence, order, etc., of the components are not limited by these terms.

When one component is referred to as being "coupled to," "combined with," or "connected to" another component, it should be understood that the component is directly coupled to, combined with or connected to the other component or is coupled to, combined with or connected to the other component via another component therebetween.

When one component is referred to as being formed or disposed "on (above) or below (under)" another component, it should be understood that the two components are in direct contact with each other or one or more components are formed or disposed between the two components. In addition, it should be understood that the terms "on (above) or below (under)" encompass not only an upward direction but also a downward direction with respect to one component.

Hereinafter, embodiments will be described in detail with reference to the accompanying drawings, and the same or corresponding components will be assigned the same reference numerals even in different drawings and a description thereof will not be redundantly described herein.

FIG. 1 is a block diagram of an incorrect triple detection system according to an embodiment of the present disclosure.

Referring to FIG. 1, an incorrect triple detection system 1 according to an embodiment of the present disclosure may include a triple selector 11, a sampler 12, a model builder 13, a filtering unit 14, and an incorrect triple detector 15.

The triple selector 11 may select a target triple in a knowledge base. The knowledge base stores a large amount of data in a triple format. The knowledge base is an effective means for expressing atypical relations of data and is applied to various artificial intelligence technologies.

Representative examples of the knowledge base include YAGO, Freebase, and DBpedia which are used in the form of an ontology. The ontology is expressed at a level of Resource Description Framework (RDF), RDF-Schema (RDF-S), or Ontology Web Language (OWL). RDF uses a graph model consisting of <subject, property, object>. The subject and the object are instances using resources each represented by a uniform resource identifier (URI), and the property is used to represent the relationship between the subject and the object. RDF-S and OWL are extensions of expressiveness of RDF and include schema, and there are various ways of representing resources in ontology design. As such, data representation through ontology enables a computer to interpret concepts expressed in triples and process knowledge. The knowledge base collects knowledge information on a website such as Wikipedia by converting the knowledge information into triples.

In one embodiment, a triple may consist of an entity subject, a property, and an object.

The sampler 12 may create a sentence model by connecting object triples sharing entities included in a target triple. The sampler 12 may create a sentence model by converting the target triple into a sentence.

The sampler 12 may create a sentence model by removing entities of the object triples.

Figure 2:
FIG. 2 is a flowchart of a method of detecting an incorrect triple in a knowledge base based on an embedding model according to an embodiment of the present disclosure.

In this case, the sampler 12 may set the number of relations differently for each of the entities in the target triple. Knowledge information is stored in a triple form in the knowledge base, and the sampler 12 may create a RDF-Sentence by sampling the target triple. The RDF-Sentence is made in the form of a sentence by connecting entities of the target triple that are shared between triples. For example, when there is a triple "Kim type Person" among triples sampled as illustrated in FIG. 2, triples containing "Kim," which is a subject of the triple, as a subject are searched for from the knowledge base and are connected to each other. Thereafter, triples containing "Person," which is an object of the triple, as an object are searched for and connected to each other into a linked triple form. The sampler 12 may limit connection of triples irrelevant to a target triple by setting the number of relations for walks connected to the subject to five and the number of relations for walks connected to the object to two.

In one embodiment, an incorrect triple detection system detects an incorrect triple by classifying features of entities of each triple. A method using an RDF-Sentence of the related art is limited in effective embedding because entities not related to a target triple are included between relations connecting triples to each other. Therefore, in an embodiment of the present disclosure, a method using a property sentence, which is a sentence model modified from the RDF-Sentence, is applied. The property sentence is a sentence including only relations after removal of entities of connected triples except a target triple that is a reference triple in the RDF-Sentence. With this method, a feature point of each entity of the target triple may be maximized and embedding may be effectively performed to aid in clustering.

The model builder 13 may embed a sentence model into a vector space to create a training entity vector and build at least one of an embedding model or a relation model.

The model builder 13 may embed the sentence model into the vector space using at least one of Skip-gram or Glove. The model builder 13 may create an entity vector by performing embedding on the sentence model, which is created by the sampler 12, using Skip-gram and Glove and build an embedding model and a relation model.

A Skip-gram model infers the presence or absence of context words around a given target word when a sentence is given. In Skip-gram, a vector value corresponding to each word is trained using a neural network such that similar words are located closer to each other. In Skip-gram, when a sentence is given, training is performed using a window size parameter by pairing a target word with context words spaced a window size from the target word.

Glove is an algorithm that supplements a shortcoming of Word2 vec (Skip-gram, CBOW) which is not capable of using statistical information of whole words of a sentence. The Glove algorithm is a count-based model that uses statistical information of the frequency of occurrence of words in a sentence and thus makes an inner product of two word vectors have the logarithm of a co-occurrence probability, unlike Skip-gram which makes an inner product of two embedded words have cosine similarity.

The model builder 13 may build an embedding model by performing clustering using a training entity vector. For example, the model builder 13 may build an embedding model by applying a K-means clustering method. In addition, the model builder 13 may normalize the embedding model by applying a threshold to a range of K clusters.

Alternatively, the model builder 13 may build a relation model by learning the training entity vector through at least one of TransE, TransR, NTN, or HolE.

The filtering unit 14 may filter out unrelated entities in the embedding model.

The incorrect triple detector 15 may detect an incorrect triple by inputting a test triple into the embedding model. The incorrect triple detector 15 may detect a test triple that is not included in the range of K clusters as an incorrect triple.

FIGS. 3 to 10 are diagrams for explaining operations of an incorrect triple detection system according to an embodiment of the present disclosure.

First, an incorrect triple detection method using an embedding model will be described. According to the present embodiment, an embedding model is created by applying K-means clustering and a threshold to a training entity vector, and an incorrect triple is detected by inputting a test entity vector.

First, entity vectors created by embedding a sentence model are divided into a training entity vector and a test entity vector.

Figure 3:
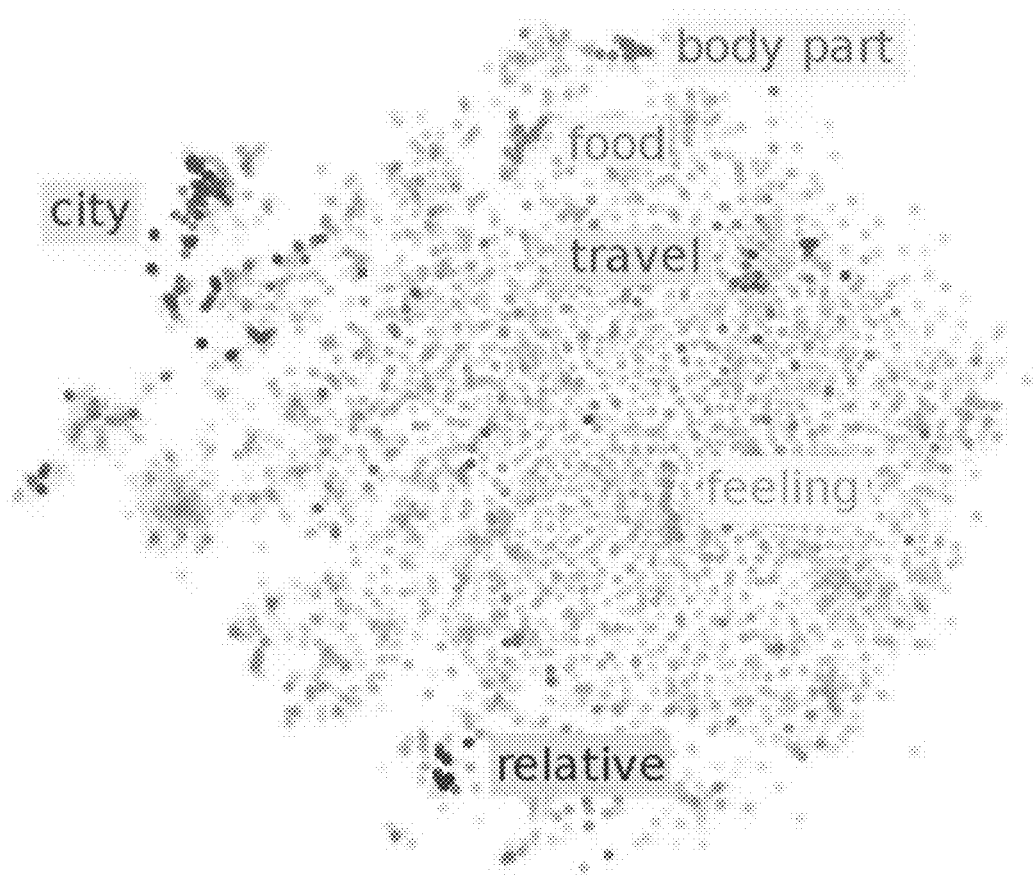
FIGS. 3 to 10 are diagrams for explaining operations of an incorrect triple detection system according to an embodiment of the present disclosure.

FIG. 3 illustrates a vector space into which the sentence model is embedded. A word vector created by vectorizing each word of a sentence has a directionality and thus may be represented in a space as illustrated in FIG. 3.

In an embodiment, the model builder 13 embeds a vector into a space of several hundreds of dimensions instead of a two-dimensional (2D) space. The higher the dimensions of a space are, the better each word vector may be embedded. In addition, because embedding is a factor that has a big influence on the performance of an experiment according to the characteristics of a method suggested in the present embodiment, a sentence model is used to exclude unrelated words that are noisy to the characteristics of each word from embedding, thereby maximizing the characteristics of each word. A model for detecting an incorrect triple may be created by performing a vector operation in the embedding space generated as described above.

Figure 4:
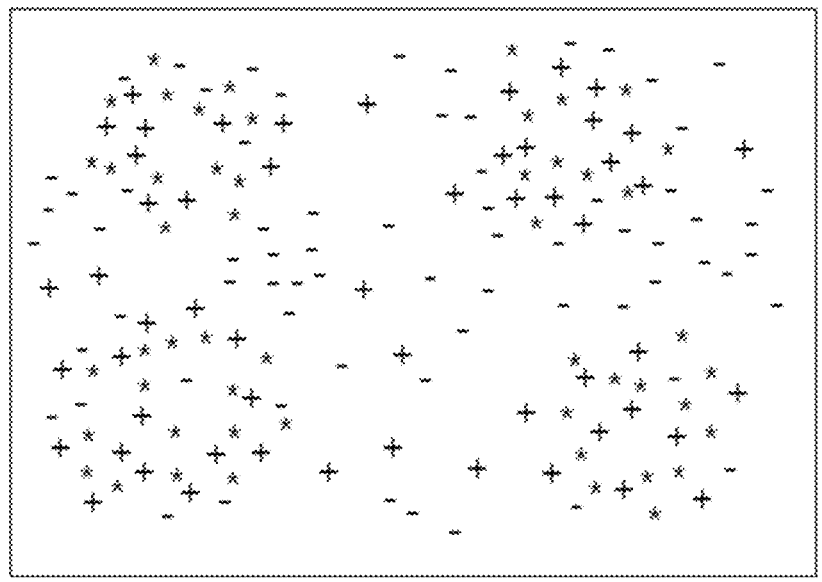
Figure 5:
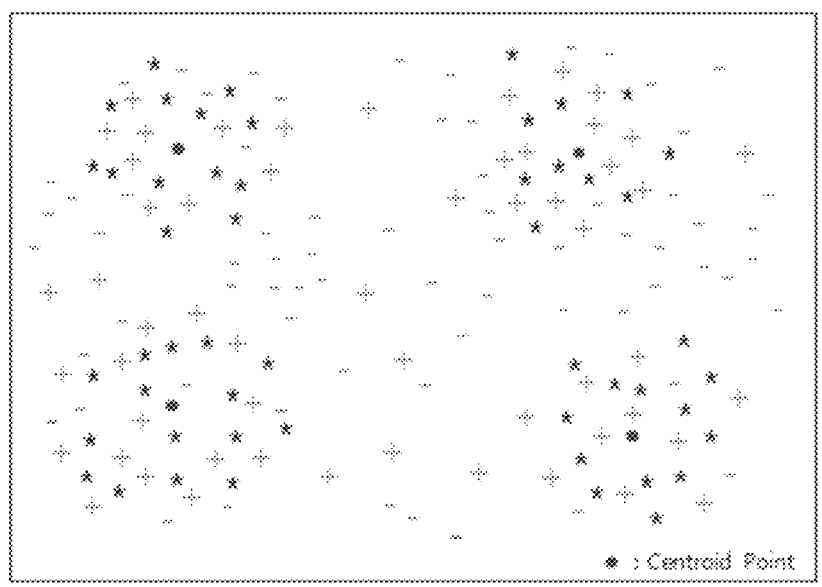
Figure 6:
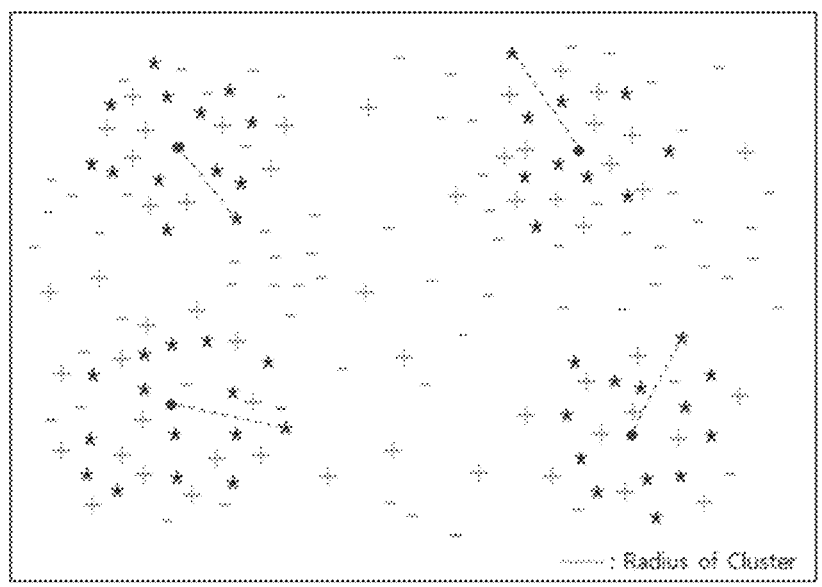
Figure 7:
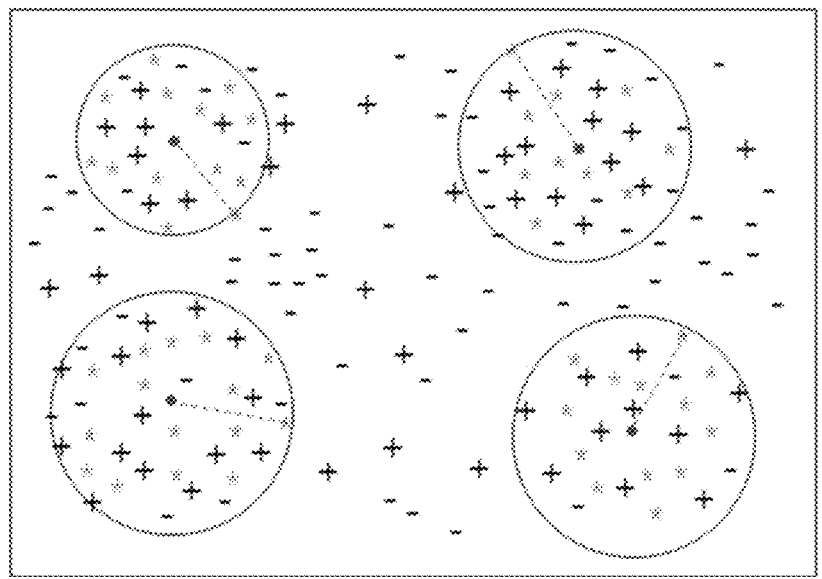

FIG. 4 is a diagram illustrating a 2D vector space for explaining a model generation method. In FIG. 4, "+" represents a correct entity vector of a test entity vector and "−" represents an incorrect entity vector. "*" represents a correct triple of a training entity vector. The model builder 13 performs K-means clustering using a corresponding training entity vector. FIG. 5 illustrates finding a centroid point by applying a K-means algorithm to a training entity vector. A centroid point of each of k clusters and information of an entity vector included in each of the k clusters are obtained using the K-means algorithm to find a range of clusters. Referring to FIG. 6, the range of clusters is set by connecting the centroid point of each of the k clusters and an entity vector farthest from the centroid point among entity vectors in each of the k clusters. In one embodiment, an algorithm used for calculation of a distance is Euclidean Distance which is used to perform clustering with the K-means algorithm. As illustrated in FIG. 7, an incorrect triple may be detected by performing an experiment using a test entity vector in an embedding model created using a training embedding vector.

However, it may be observed that the embedding model obtained by the above method included all correct entities (*) of training entity vectors in all of the clusters. That is, this means that a model that is overfit to training data was created. The overfitting model may degrade incorrect triple detection performance when a test experiment is conducted.

Figure 8:
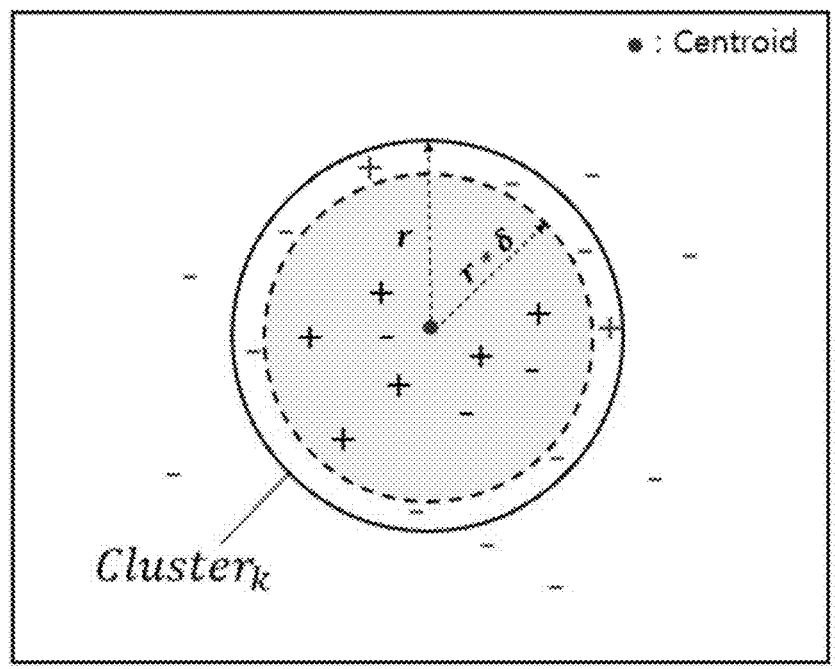

In the present embodiment, in order to solve this problem, a model is normalized by applying a threshold δ to the range of clusters. The model builder 13 creates a model for finding an optimal Error Base F1-measure by multiplying a range r of k clusters by the threshold δ as illustrated in FIG. 8. "+" represents a word vector of a correct triple of a training embedding vector, and "−" represents a word vector of an incorrect triple of the training embedding vector. By applying the threshold δ, a model may be created by finding a range for most accurately classifying a correct triple and an incorrect triple.

For example, when an experiment is conducted to detect an incorrect triple among triples having a type of "person," "+" represents an entity vector corresponding to person and "−" represents an entity vector with a class other than person. A "+" entity vector that is within the range is a true positive, and a "+" entity vector that is not within the range is a false negative. A "−" entity vector that is within the range is a false positive, and a "−" entity vector that is not within the range is a true negative. A model may be created by finding a threshold for obtaining a best result by a verification method using the above four entity vectors.

Next, an incorrect triple detection method using a relation model will be described. In the relation model, an incorrect triple is detected by building a relation model through various knowledge completion models by inputting triples and entity vectors. In one embodiment, a single relation model and an ensemble model are applied to detect an incorrect triple. In the single relation model, a relation model is built by learning a training entity vector using four knowledge completion models, e.g., TransE, TransR, NTN, and HolE, and a triple classification threshold is calculated using a development data set. Incorrect triple detection is performed by inputting a test entity vector to four relation models built as described above.

Figure 9:
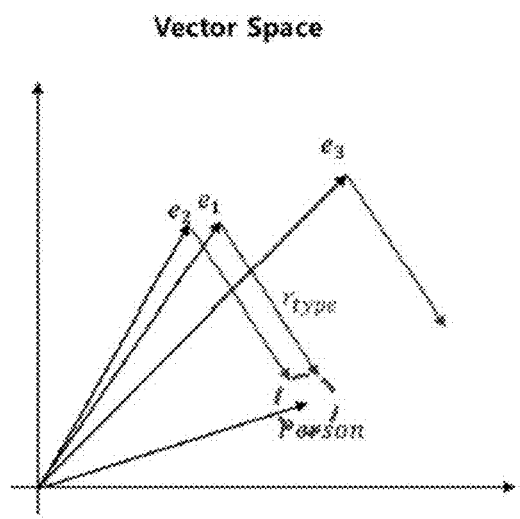
Figure 10:
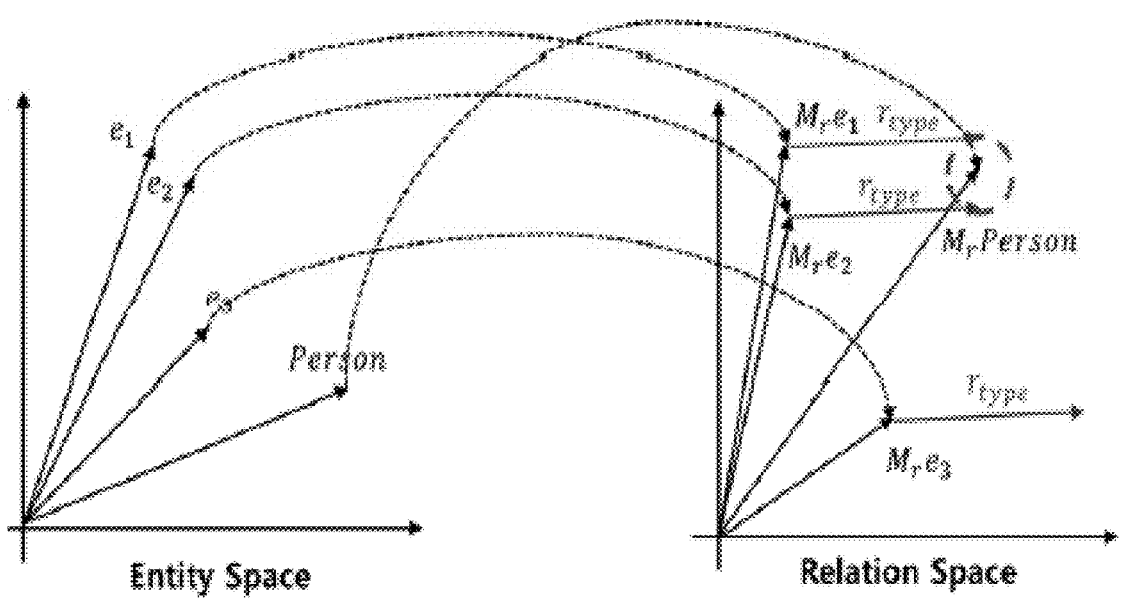

FIGS. 9 and 10 illustrate a case in which three triples (e1, type, person), (e2, type, person), and (e3, type, person) are given as experimental data to a relation model built using training data.

FIG. 9 illustrates a method of detecting an incorrect triple using TransE, in which when a triple is given, entities are represented in the form of a vector in an embedding space and a score of the triple is measured by performing an operation between represented vectors. The two entities e1 and e2 are located in a circle indicated by a dotted line and representing a range of a threshold, and the entity e3 is located outside the circle.

This case may be expressed by Equation 1 below. Accordingly, a score greater than the threshold is derived from the triple (e3, type, Person) and thus the triple (e3, type, Person) is detected as an incorrect triple.

$$\begin{aligned} |e_1 + r_{type} - \text{Person}| < \theta \rightarrow \text{True} \\ |e_2 + r_{type} - \text{Person}| < \theta \rightarrow \text{True} \\ |e_3 + r_{type} - \text{Person}| > \theta \rightarrow \text{False} \end{aligned}$$ [Equation 1]

FIG. 10 illustrates an incorrect error detection method using TransR that is an improvement over TransE. Unlike TransE, an $M_r$ matrix, which is a new parameter for representing a vector, is included in TransR. The $M_r$ matrix is created and used for each relation and used to map an entity to each relation space. The relation model trained in the same way as TransE is indicated by rtype, and a circle indicated by a dotted line represents a range of a threshold obtained using a development data set. It can be seen that $M_{re3}$ is beyond the range of the threshold and thus $e_3$ is detected as an incorrect triple. A vector obtained by multiplying each entity by the $M_r$ matrix is applied to a position of each entity. Through the above process, a score of a triple is calculated and classified as correct or incorrect to detect an incorrect triple.

In the case of HolE and NTN models, an incorrect triple is detected by performing triple classification according to a score of a triple calculated using each score function.

Therefore, an incorrect triple detection method using relation modeling is started by training a classification model according to relations using triples and entity vectors as inputs. Parameters of models built using TransE, TransR, HolE, and NTN, which are four relation single modeling algorithms, are trained and an incorrect triple is detected using the trained models.

In an ensemble model, an incorrect triple is detected on the basis of a result of counting prediction results of the four single relation models. There are four ensemble models M1, M2, M3, and M4. In M1, a triple predicted as false by one among the four single relation models is detected as an incorrect triple. In M2, a triple predicted as false by two among the four single relation models is detected as an incorrect triple. In M3, a triple predicted as false by three among the four single relation models is detected as an incorrect triple. Lastly, in M4, a triple predicted as false by all of the four single relation models is detected as an incorrect triple. That is, a condition under which an incorrect triple is detected is most easily achieved in the case of M1 and becomes more difficult to achieve sequentially from M1 to M4.

Figure 11:
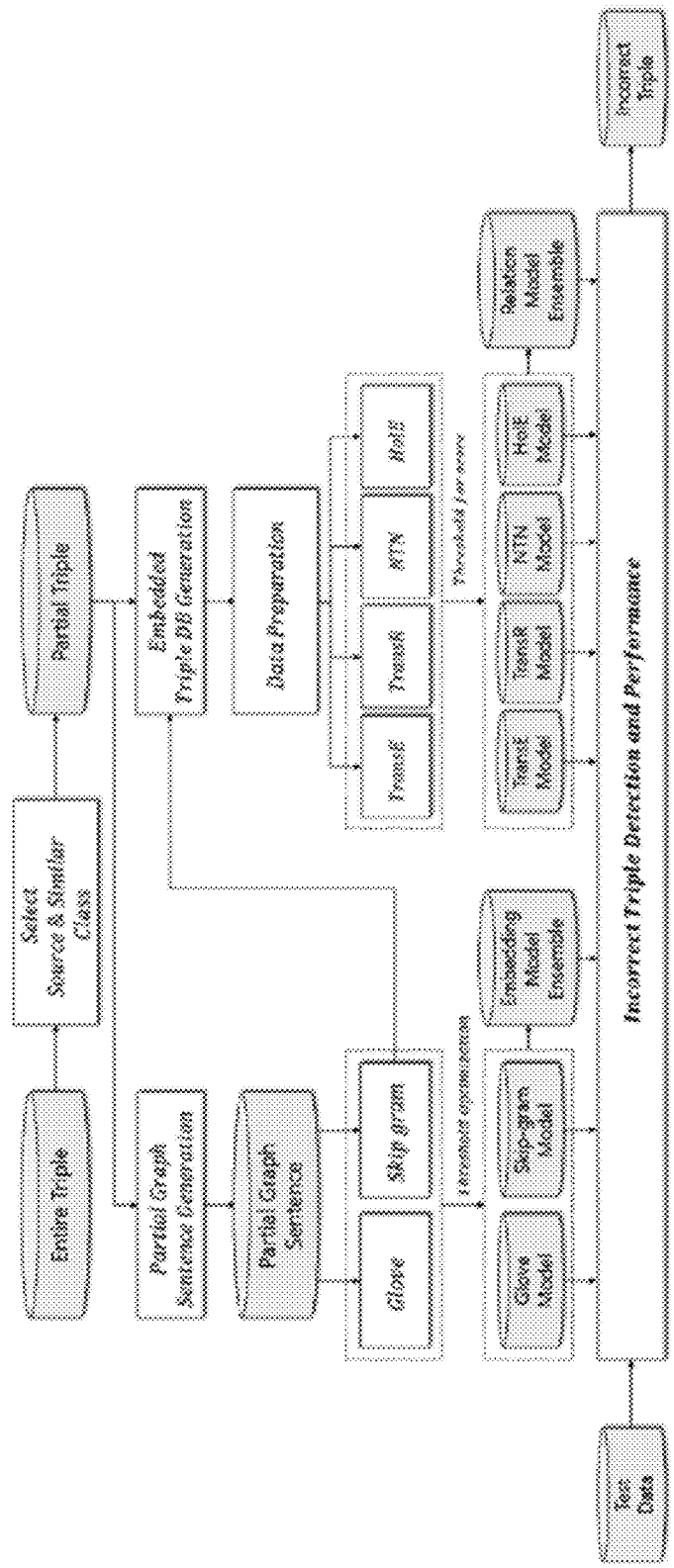
FIGS. 11 through 13 are diagrams for explaining results of an error detection test conducted by an incorrect triple detection system according to an embodiment of the present disclosure.
Figure 12:
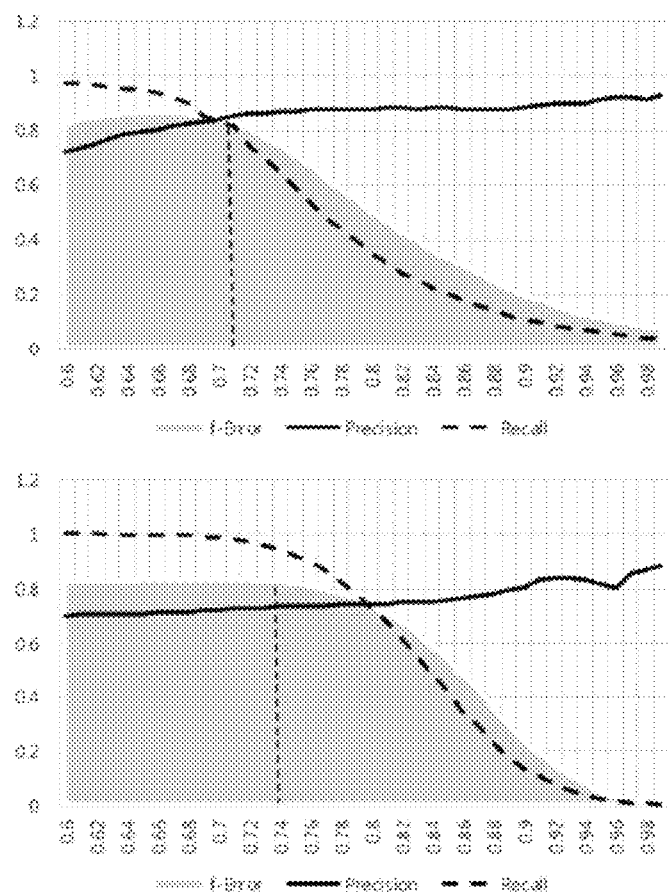
Figure 13:
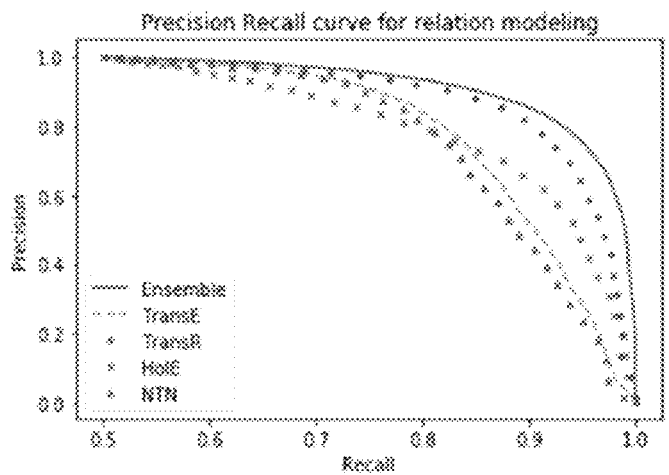

FIGS. 11 through 13 are diagrams for explaining results of an error detection test conducted by an incorrect triple detection system according to an embodiment of the present disclosure.

In one embodiment, data of FreeBase, DBPedia, and WiseKB, which are representative knowledge bases, was used for an incorrect triple detection experiment, an incorrect triple was detected from the data of each of the knowledge bases using an embedding model, a relation model, an embedding ensemble model, and a relation ensemble model, and results were compared by a model verification technique.

FIG. 11 is a flowchart of incorrect triple detection according to an embodiment, in which incorrect triple detection is started by selecting two source classes for detecting an incorrect triple for each knowledge base and selecting different similar classes for each of the source classes. Triples used for model training were partial triples other than all triples, including 20,000 triples having a type of "source class" and 5,000 triples having a type of "similar class".

In addition, a total of 10,000 triples having the type of "source class" as type were sampled as a data set for an experiment, in which 5,000 triples among the 10,000 triples were randomly sampled and 5,000 triples having the type of "similar class" were sampled, and the number of incorrect triples detected from among 10,000 pieces of test data for each model was identified.

For the experiment, a sentence model generation process was performed to generate a property sentence from a total of 40,000 sampled triples. This process is to generate a vector for an entity of each triple. Because 500 sentences were generated for each triple, a total of 20 million rows of sentences were generated and embedding was performed on each of the sentences using Skip-Gram and Glove. An embedding model was generated by performing clustering on embedding vectors using the K-means algorithm. Model optimization was performed by applying a threshold to generated clusters. The threshold was a real number smaller than 1 to be applied to a range of clusters generated, and a model was generated by decreasing the range of clusters until a highest model evaluation index was obtained by multiplying the range of clusters, which was generated based on training data, by the threshold.

An embedding model and an embedding ensemble model generated as described above were verified and compared with each other. In the embedding ensemble model, a triple predicted as false by at least one of Skip-gram and Glove, which are two embedding algorithms, was detected as an incorrect triple.

In addition, in the case of a relation model to be compared with the embedding model described above, an experiment was performed after a data preparation process of dividing a data set into Training, Dev, and Test Data. Model training was conducted using training data, and a score threshold was calculated using Dev data. A detection experiment was carried out with test data using a model and the threshold obtained as described above. A relation modeling algorithm used was trained using TransE, TransR, NTN, and HolE, and a single relation model and a relation ensemble model were verified and verification results were compared with each other.

Because both an embedding model method and a relation model method are directed to generating models for detecting an incorrect triple, each model was verified using precision, recall, and F1-measure based on a true negative, the experiment was performed ten times by randomly sampling an experimental data set to obtain a standard result, and two experiment results were compared with each other by calculating an average.

TABLE 1

| Data Set | Triple Count | Entity Count | Class Count | Relation Count |
|---|---|---|---|---|
| FreeBase | 17,887K | 6,600K | 6,699 | 1,159 |
| DBPedia | 22,955K | 5,919K | 418 | 663 |
| WiseKB | 31,068K | 9,442K | 1,673 | 555 |

Experiment data was built by extracting a partial knowledge base from three knowledge bases. Table 1 shows statistics of the three knowledge bases used in the experiment. Each of the knowledge bases is a large-capacity knowledge base and was built by refining existing knowledge bases.

TABLE 2

| Data Set | Target Triple Class | Similar Triple Class (Number of Triples) | | | | |
|---|---|---|---|---|---|---|
| Free Base | Person 40,000 | City 2,000 | Country 2,000 | School 2,000 | Sports Team 2,000 | Film 2,000 |
| | Actor 40,000 | Location 2,000 | Book 2,000 | Football Player 2,000 | Structure 2,000 | Animal 2,000 |
| DB Pedia | Person 40,000 | City 2,000 | Company 2,000 | School 2,000 | Album 2,000 | Television Show 2,000 |
| | Film 40,000 | School 2,000 | Bird 2,000 | Ship 2,000 | Town 2,000 | Mountain 2,000 |
| Wise KB | Person 40,000 | City 2,000 | Organization 2,000 | Song 2,000 | Show 2,000 | Education Institution 2,000 |
| | Organization 40,000 | City 2,000 | Person 2,000 | Song 2,000 | Show 2,000 | Plant 2,000 |

Table 2 shows target classes and similar classes selected to build each experimental data set. Target class triples were triples with classes that were targets of an incorrect triple detection experiment and 40,000 triples were sampled for each of the classes. Similar class triples were triples with classes intended to aid in training and a total of 10,000 similar class triples were used by sampling 2,000 triples for each of the classes. There were incorrect triples such as <Busan> <type> <person> among triples having a type of "person." Because the more triples used, the better embedding can be performed in a vector space, (2,000) triples each having a certain number of classes among triples in each knowledge base were randomly selected.

TABLE 3

| Data Set | Target Triple Class | Skip-gram Threshold | Glove Threshold |
|---|---|---|---|
| FreeBase | Person | .071 | 0.74 |
| | Actor | .073 | 0.71 |
| DBPedia | Person | 0.72 | 0.61 |
| | Film | 0.78 | 0.65 |
| WiseKB | Person | 0.83 | 0.62 |
| | Organization | 0.81 | 0.65 |

First, Skip-gram and Glove, which are embedding detection models, were built by performing model optimization using thresholds after clustering. Table 3 shows an optimum threshold obtained by applying a threshold that is in a range of 0.6 to 0.98 to each of six experimental data sets as described above with reference to FIG. 8.

FIG. 12 is a graph showing the performance of a model for a test set versus a change of a threshold. A first graph shows an evaluation index of a Skip-gram embedding vector according to a threshold, and a second graph shows an evaluation index of an embedding vector using Glove according to a threshold. Because F-Error was determined according to precision and recall values shown in each of the graphs, a threshold with optimal F-Error was calculated such that the precision or recall value was not biased to one side.

As the threshold increased in both Skip-gram and Glove, the precision value increased and the recall value decreased. A large threshold represents that a range of clusters is wide and thus there may occur a problem that many negative sets cannot be covered. Therefore, the precision value increased but the recall value decreased to a large extent. Therefore, a threshold leading to an optimum precision value and an optimum recall value was selected and applied to models.

FIG. 13 is a precision-recall curve showing a result of an incorrect triple detection experiment performed by relation-modeling of data with "person" as a target class of a freebase. TransE, TransR, HolE, and NTN which are four single relation models and an ensemble model of relation modeling were used as detection models. The precision-recall curve represents that a model with a wider range is a better model. As a result, TransR exhibits highest performance and NTN exhibits lowest performance among the single relation models. As characteristics of single relation modeling, HolE exhibits lower precision and higher recall than other models. In addition, the ensemble model may be built to improve model performance, thereby achieving better performance than that of TransR.

TABLE 4

| Data Set | Target Relation | Matrics | Entity Embedding | | Relation Modeling | | | | | | | |
|---|---|---|---|---|---|---|---|---|---|---|---|---|
| | | | Skip-gram | Skip-Glove | Glove | Single Model | | | | Ensemble Model | | | |
| | | | | | | NTN | TransE | TransR | HolE | $M_1$ | $M_2$ | $M_3$ | $M_4$ |
| Free base | type Person | Precision | 0.852 | 0.734 | 0.763 | 0.862 | 0.727 | 0.828 | 0.722 | 0.645 | 0.854 | 0.923 | 0.944 |
| | | Recall | 0.810 | 0.940 | 0.990 | 0.731 | 0.888 | 0.886 | 0.880 | 0.983 | 0.932 | 0.813 | 0.672 |
| | | F-Score | 0.830 | 0.824 | 0.861 | 0.791 | 0.800 | 0.856 | 0.793 | 0.779 | 0.891 | 0.864 | 0.802 |
| | type Actor | Precision | 0.743 | 0.772 | 0.712 | 0.844 | 0.735 | 0.799 | 0.771 | 0.669 | 0.856 | 0.918 | 0.988 |
| | | Recall | 0.760 | 0.870 | 0.994 | 0.710 | 0.862 | 0.843 | 0.834 | 0.976 | 0.912 | 0.802 | 0.689 |
| | | F-Score | 0.751 | 0.818 | 0.830 | 0.771 | 0.793 | 0.820 | 0.801 | 0.794 | 0.883 | 0.856 | 0.812 |
| DB pedia | type Person | Precision | 0.728 | 0.719 | 0.759 | 0.774 | 0.798 | 0.819 | 0.725 | 0.634 | 0.795 | 0.917 | 0.973 |
| | | Recall | 0.890 | 0.950 | 0.991 | 0.720 | 0.772 | 0.866 | 0.852 | 0.990 | 0.953 | 0.813 | 0.453 |
| | | F-Score | 0.764 | 0.821 | 0.860 | 0.746 | 0.785 | 0.842 | 0.784 | 0.773 | 0.867 | 0.862 | 0.618 |
| | type Film | Precision | 0.735 | 0.763 | 0.711 | 0.762 | 0.790 | 0.805 | 0.726 | 0.632 | 0.802 | 0.916 | 0.980 |
| | | Recall | 0.740 | 0.830 | 1.000 | 0.711 | 0.764 | 0.821 | 0.843 | 0.988 | 0.941 | 0.798 | 0.501 |
| | | F-Score | 0.737 | 0.795 | 0.830 | 0.736 | 0.777 | 0.813 | 0.780 | 0.770 | 0.866 | 0.853 | 0.663 |
| Wise KB | type Person | Precision | 0.712 | 0.702 | 0.767 | 0.842 | 0.675 | 0.865 | 0.681 | 0.617 | 0.799 | 0.941 | 0.995 |
| | | Recall | 0.810 | 0.890 | 0.971 | 0.667 | 0.732 | 0.827 | 0.818 | 0.986 | 0.944 | 0.752 | 0.460 |
| | | F-Score | 0.758 | 0.851 | 0.857 | 0.744 | 0.703 | 0.845 | 0.743 | 0.759 | 0.866 | 0.836 | 0.629 |
| | type Organization | Precision | 0.748 | 0.765 | 0.70 | 0.800 | 0.711 | 0.824 | 0.732 | 0.610 | 0.803 | 0.930 | 0.983 |
| | | Recall | 0.800 | 0.840 | 1.000 | 0.701 | 0.854 | 0.811 | 0.802 | 0.984 | 0.927 | 0.764 | 0.481 |
| | | F-Score | 0.773 | 0.801 | 0.830 | 0.747 | 0.776 | 0.818 | 0.765 | 0.753 | 0.861 | 0.839 | 0.646 |

Table 4 shows an experimental result of all eleven detection models for three data sets. In each of the data sets, values of models showing the best performance of three evaluation indices are indicated in bold. In all of the data sets, Model 4, which is a relation ensemble model, exhibits the highest performance in precision, which is a first evaluation index, and an embedding model exhibits the highest performance in recall, which is a second evaluation index. Model 2 of a relation ensemble modeling exhibits the highest performance in F-score, which is the last evaluation index. With a balanced ensemble of results of relational single modeling, high precision and recall may be achieved to obtain high F-score performance. Accordingly, Model 2 of relation ensemble modeling and the embedding ensemble model proposed in the present disclosure show better performance than that of other single modeling and may be regarded as effective models for incorrect triple detection in a knowledge base.

TABLE 5

| Data Set | Target Triple Class | Similar Triple Class (Number of Triples) | | | | |
|---|---|---|---|---|---|---|
| Free Base | Person 40,000 | City 2,000 | Country 2,000 | School 2,000 | Sports Team 2,000 | Film 2,000 |
| | Actor 40,000 | Location 2,000 | Book 2,000 | Football Player 2,000 | Structure 2,000 | Animal 2,000 |
| DB Pedia | Person 40,000 | City 2,000 | Company 2,000 | School 2,000 | Album 2,000 | Television Show 2,000 |
| | Film 40,000 | School 2,000 | Bird 2,000 | Ship 2,000 | Town 2,000 | Mountain 2,000 |
| Wise KB | Person 40,000 | City 2,000 | Organization 2,000 | Song 2,000 | Show 2,000 | Education Institution 2,000 |
| | Organization 40,000 | City 2,000 | Person 2,000 | Song 2,000 | Show 2,000 | Plant 2,000 |

Table 5 is a table comparing an embedding time with a time required to model each model. Experimental data of all three experimental data sets, i.e., FreeBase, DBPedia, and WiseKB, are expressed, in which triples and entities of the experimental data of all of the three data sets are the same in size and thus times required therefor are the same. For each model, an average embedding time was nine hours in the case of Skip-gram and six hours in the case of Glove. As a modeling time, clustering times in the case of Skip-gram and Glove were measured and a training time was measured in the case of relation modeling. In the case of ensemble models, the sum of a clustering time and a training time of each single model for ensemble was calculated. Modeling times of Skip-gram and Glove, which are embedding models, were each about three hours, and a modeling time of NTN, which is a relation model, was about nine hours, which was the largest amount of time among those of four single relation models. NTN is a model of a neural network structure using a tensor network with the largest number of parameters and it takes the longest time to learn. A modeling time of an embedding ensemble model was about six hours and a modeling time of a relation ensemble model was about eleven hours. As a result, ensemble models showed higher performance than those of single models but modeling times thereof were longer than those of the single models. In addition, relational ensemble modeling took more time than embedding ensemble modeling.

In conclusion, it is observed that the embedding ensemble model had the highest recall among recall of the other models, and the highest precision was achieved in the case of M4 among ensemble results using the relation model. An M2 ensemble model is observed to be the highest in terms of overall incorrect triple detection performance. In terms of training speed, it is observed that a result of an ensemble using the embedding model required a smaller amount of training time than a result of an ensemble using the relation model.

An incorrect triple detection system of the present disclosure is capable of detecting errors in a knowledge base to improve quality and performance of existing knowledge services.

The incorrect triple detection system of the present disclosure is capable of increasing accuracy of a task of inferring new knowledge from the knowledge base.

In addition, the incorrect triple detection system of the present disclosure is applicable to various service fields of artificial intelligence using a knowledge base.

As used herein, the term "unit" refers to software or a hardware component, such as a field-programmable gate array (FPGA) or an application-specific integrated circuit (ASIC), which performs certain functions. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Functions provided in components and "units" may be combined to obtain a smaller number of components and "units" or may be divided into sub-components and "sub-units." In addition, the components and "units" may be implemented to implement one or more CPUs in a device or a secure multimedia card.

While embodiments of the present disclosure have been described above, it will be apparent to those of ordinary skill in the art that various modifications and changes may be made therein without departing from the spirit and scope of the present disclosure described in the following claims.

What is claimed is:

1. An incorrect triple detection system comprising:
   a triple input unit configured to receive a target triple including an entity subject, a property and an object from a knowledge base;
   a sampler configured to create a sentence model by connecting object triples sharing entities included in the target triple supplied from the triple input unit, removing entities of the object triples and converting the target triple into a sentence;
   a model builder configured to embed the sentence model supplied from the sampler into a vector space using a Glove algorithm to create a training entity vector, and build an embedding model by performing clustering using the training entity vector or a relation model by learning the training entity vector; and
   an incorrect triple detector configured to detect an incorrect triple by inputting a test triple into the trained embedding model or the trained relation model supplied from the model builder and detecting the test triple as the incorrect triple when the test triple is not included in range of K clusters.

2. The incorrect triple detection system of claim 1, wherein the sampler sets the number of relations differently for each of the entities of the target triple.

3. The incorrect triple detection system of claim 1, further comprising a filtering unit configured to filter out unrelated entities from the embedding model built by the model builder.

4. The incorrect triple detection system of claim 1, wherein the model builder build the embedding model by applying a K-means clustering method.

5. The incorrect triple detection system of claim 1, wherein the model builder normalizes the embedding model by applying a threshold to the range of K clusters.

6. The incorrect triple detection system of claim 1, wherein the model builder builds the relation model by learning the training entity vector through at least one of TransE, TransR, NTN, or HolE.

7. An incorrect triple detection method comprising:
   receiving a triple by selecting a target triple including an entity subject, a property, and an object from a knowledge base;
   creating a sentence model by connecting object triples sharing entities included in the target triple, removing entities of the object triples and converting the target triple into a sentence;
   building a model by embedding the sentence model into a vector space using a Glove algorithm to create a training entity vector, and building an embedding model or a relation model by performing K-means clustering using the training entity vector or a relation model by learning the training entity vector; and
   detecting an incorrect triple by inputting a test triple into the trained embedding model or the trained relation model and detecting the test triple as the incorrect triple when the test triple is not included in the range of clusters.

8. The incorrect triple detection method of claim 7, wherein the creating of the sentence model comprises setting the number of relations differently for each of the entities of the target triple.

9. The incorrect triple detection method of claim 7 further comprising, after the building of the embedding model, filtering out unrelated entities from the embedding model.

10. The incorrect triple detection method of claim 7, wherein the building of the model comprises building the embedding model by applying a K-means clustering method.

11. The incorrect triple detection method of claim 7, wherein the building of the model comprises normalizing the embedding model by applying a threshold to the range of K clusters.

12. The incorrect triple detection method of claim 7, wherein the building of the model comprises building the relation model by learning the training entity vector through at least one of TransE, TransR, NTN, or HolE.

* * * * *